United States Patent
Bucci et al.

(10) Patent No.: US 11,132,483 B2
(45) Date of Patent: Sep. 28, 2021

(54) METHOD AND ARRANGEMENT FOR FORMING AN ELECTRONIC CIRCUIT

(71) Applicant: Infineon Technologies AG, Neubiberg (DE)

(72) Inventors: Marco Bucci, Graz (AT); Raimondo Luzzi, Graz (AT)

(73) Assignee: Infineon Technologies AG, Neubiberg (DE)

( * ) Notice: Subject to any disclaimer, the term of this patent is extended or adjusted under 35 U.S.C. 154(b) by 182 days.

(21) Appl. No.: 16/382,271

(22) Filed: Apr. 12, 2019

(65) Prior Publication Data

US 2019/0318049 A1    Oct. 17, 2019

(30) Foreign Application Priority Data

Apr. 16, 2018  (DE) .................... 10 2018 108 951.1

(51) Int. Cl.
  *G06F 30/30*   (2020.01)
  *G06F 30/327*  (2020.01)
  *G06F 111/20*  (2020.01)
  *G06F 119/18*  (2020.01)

(52) U.S. Cl.
  CPC ........ *G06F 30/327* (2020.01); *G06F 2111/20* (2020.01); *G06F 2119/18* (2020.01)

(58) Field of Classification Search
  CPC ............... G06F 30/327; G06F 2111/20; G06F 2119/18; G11C 29/54; G11C 29/38
  USPC ....................................................... 716/103
  See application file for complete search history.

(56) References Cited

U.S. PATENT DOCUMENTS

| | | | | |
|---|---|---|---|---|
| 5,696,771 A * | 12/1997 | Beausang | ...... | G01R 31/318586 714/726 |
| 6,434,733 B1 * | 8/2002 | Duggirala | ...... | G01R 31/318536 716/124 |
| 6,539,536 B1 * | 3/2003 | Singh | ...................... | G06F 30/30 716/102 |
| 6,990,642 B2 * | 1/2006 | Arakawa | .......... | G01R 31/31858 716/103 |
| 2012/0079332 A1 * | 3/2012 | Doumenjou | ..... | G01R 31/31719 714/726 |
| 2015/0026531 A1 * | 1/2015 | Kosonocky | .... | G01R 31/318575 714/726 |

(Continued)

FOREIGN PATENT DOCUMENTS

WO    2005041410 A1    5/2005

OTHER PUBLICATIONS

"New Approach to Level Sensitive Scan Design Testing", IBM Technical Disclosure Bulletin, vol. 30, Issue 7, pp. 188-190, Dec. 1, 1987 (Year: 1987).*

(Continued)

*Primary Examiner* — Jack Chiang
*Assistant Examiner* — Brandon Bowers
(74) *Attorney, Agent, or Firm* — Viering, Jentschura & Partner mbB

(57) ABSTRACT

According to an embodiment, a method for forming an electronic circuit is provided including forming a netlist of an electronic circuit having a multiplicity of flip-flops, selecting groups of flip-flops from the multiplicity of flip-flops, providing, for each selected group of flip-flops, an error detection circuit for the flip-flops of the group and forming the electronic circuit based on the netlist to include the provided error detection circuits.

12 Claims, 7 Drawing Sheets

(56) References Cited

U.S. PATENT DOCUMENTS

2017/0082686 A1* 3/2017 MacDonald ............ G06F 11/27

OTHER PUBLICATIONS

German Office Action based on Application No. 10 2018 108 951.1 (5 pages) dated Oct. 17, 2018 (for reference purpose only).
Ananiads et al. "On the Development of a New Countermeasure Based on a Laser Attack RTL Fault Model". In: 2016 Design, Automation & Test in Europe Conference & Exhibition (DATE), pp. 445-450, IEEE 2016.—ISSN 2558-1101; ISBN 978-3-9815-3707-9.
Jaiswal et al. "Verilog Netlist Rearrangement Technique in Microwind". In: 2017 Third International Conference on Computing, Communication, Control and Automation (ICCUBEA), IEEE 2017.

* cited by examiner

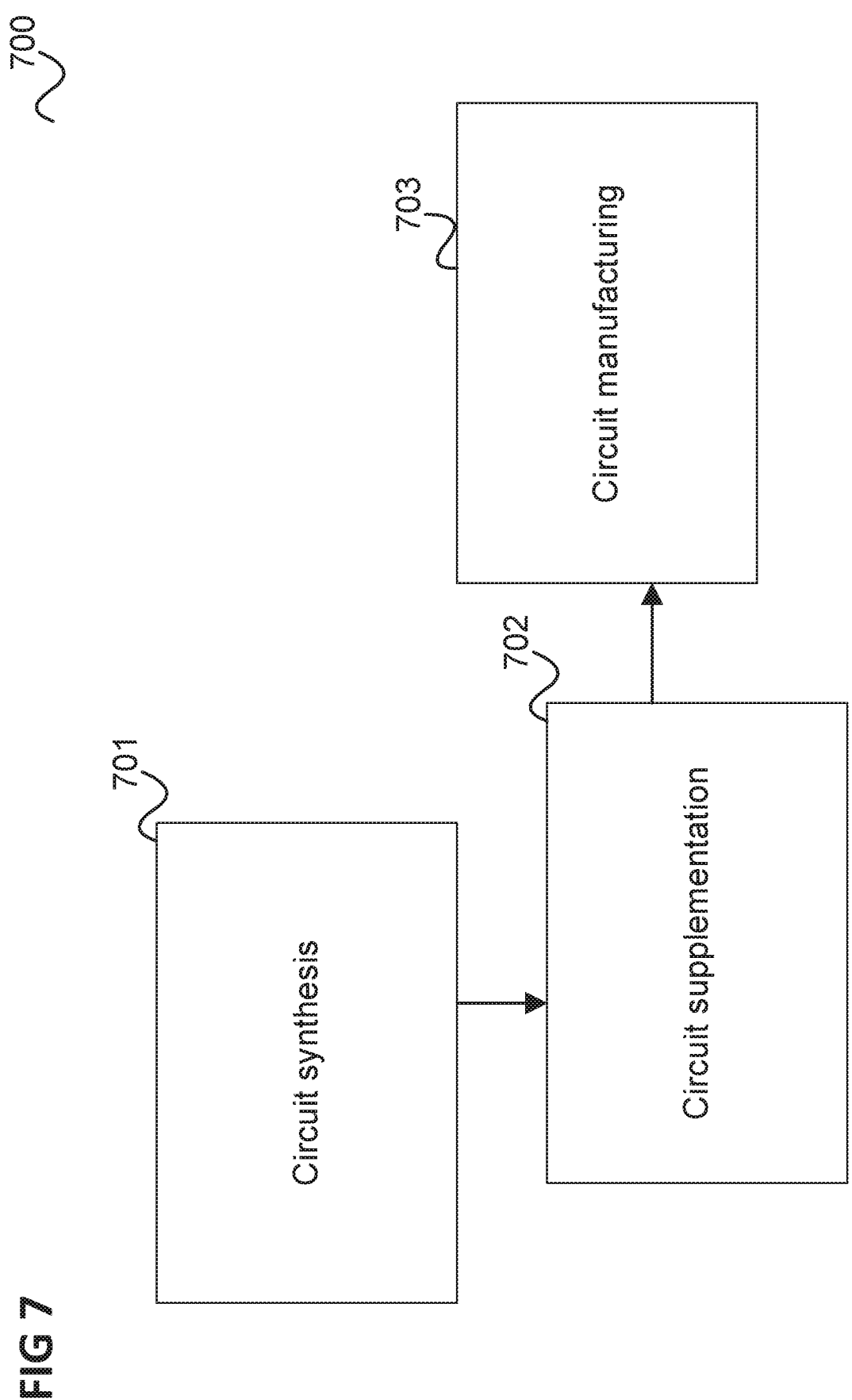

METHOD AND ARRANGEMENT FOR FORMING AN ELECTRONIC CIRCUIT

CROSS-REFERENCE TO RELATED APPLICATION

This application claims priority to German Patent Application Serial No. 10 2018 108 951.1, which was filed Apr. 16, 2018, and is incorporated herein by reference in its entirety.

TECHNICAL FIELD

The present disclosure relates to methods and arrangements for forming an electronic circuit.

BACKGROUND

In security-related applications, electronic circuits typically need to be protected against faults which may be deliberately caused by an attacker, e.g. to read-out or manipulate confidential information, or may be caused by malfunction. This applies to both processing logic as well as memory elements, such as flip-flops. Protection is typically achieved by introducing redundancy in the digital design of an electronic circuit. Since this introduces complexity, efficient approaches for circuit protection are desirable.

SUMMARY

According to an embodiment, a method for forming an electronic circuit is provided including forming a netlist of an electronic circuit having a multiplicity of flip-flops, selecting groups of flip-flops from the multiplicity of flip-flops, providing, for each selected group of flip-flops, an error detection circuit for the flip-flops of the group and forming the electronic circuit based on the netlist to include the provided error detection circuits.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 7 shows an arrangement for forming an electronic circuit.

DESCRIPTION

Figure 1:
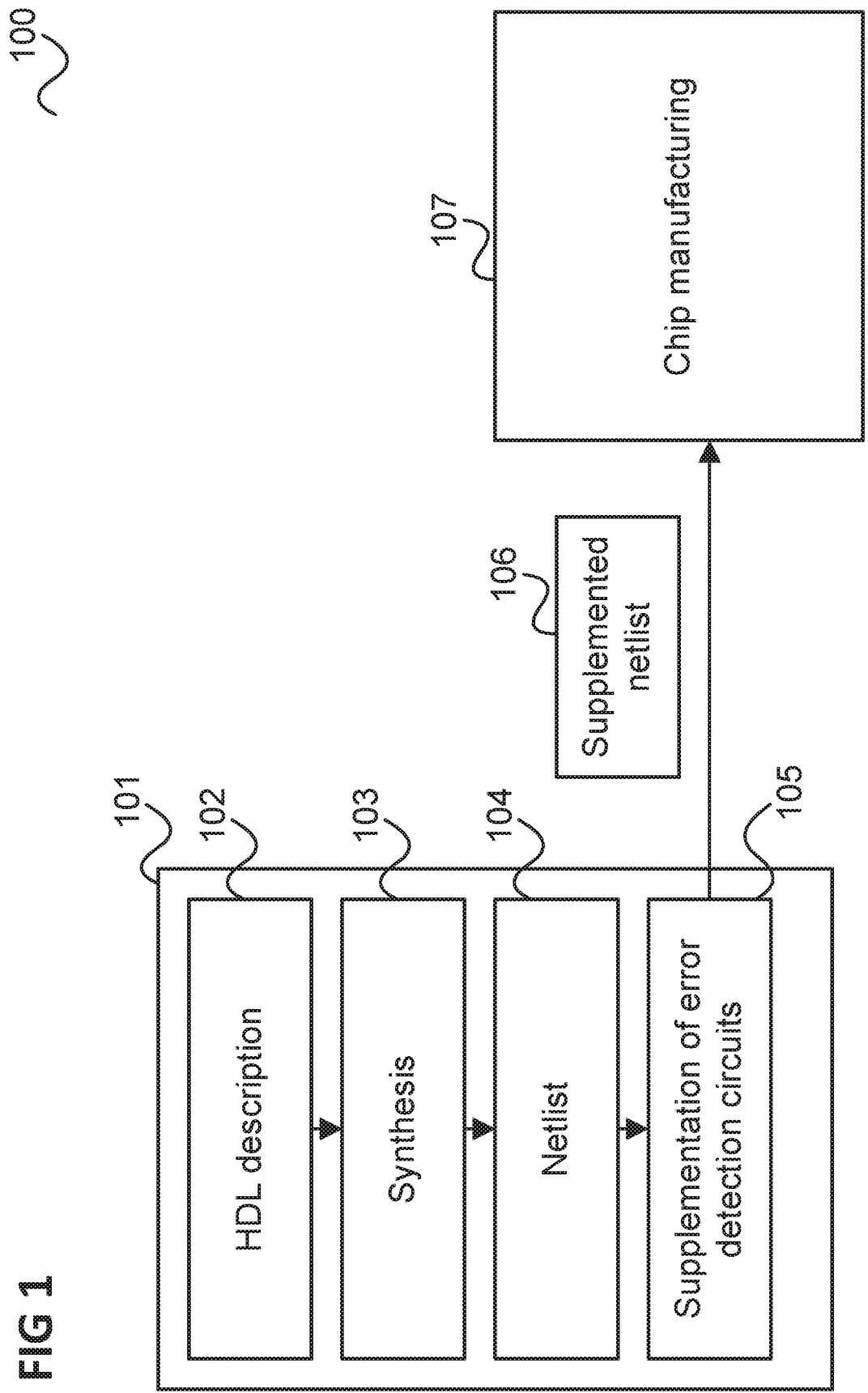
FIG. 1 shows a processing arrangement for forming an electronic circuit.

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

The usage of an ECC (Error Correction Code) is a typical measure for the protection of a RANI (Random Access Memory) in a high availability computer system. Furthermore, attack detection mechanisms are typically used for protection of security-related elements such as memories. However, a RANI memory is typically not the only memory element in a digital system which may further includes registers, flip-flops etc. and detection methods are often not very sensitive and/or prone to false alarms. The non-negligible probability of a false alarm may make it undesirable that a detection method may permanently disable a device which seems to be attacked. This means that an attacker may have the opportunity to make several attempts until he succeeds.

In high-availability and/or high-security applications, different redundancy techniques can be applied. As an example, in high-availability applications multiple fault detection systems (possibly consisting even of different hardware and software components) can be operated in parallel, thus, allowing to detect a single fault (or a bug) and decide about the presence of a fault with e.g. a majority decision. However, this is an approach which implies relevant additional costs, dimensions, power consumption etc.

Redundancy can be also introduced into a digital design by acting at HDL (hardware description language) level (e.g. VHDL or Verilog). Namely, redundancy can be introduced in the memory elements or in the combinatorial processes. However, acting at HDL level implies a strong impact on the design, making it usually more complex, less readable and more difficult to verify and maintain. Additionally, when using error detection/correction codes, it is not easy or maybe even not possible to design an efficient code for a generic data size. Namely, small data sizes have less efficient coding. It is also worthwhile to note that the simple duplication of memory elements, although it is expensive, is not very efficient. Indeed, it cannot protect against a double error while an error detection/correction code can do it with much less redundancy.

According to various embodiments, an automatic method is provided which allows the transparent implementation of error detection/correction codes on memory elements (i.e. D-flip-flops) of a generic synchronous device (including electronic circuitry).

The method allows protecting the device from accidental or malicious corruption of its state, namely the flipping of one or more D-flip-flop states due to electric disturbances, radiations or malicious attacks performed by laser beams, electronic beams or by any method which changes the output of a D-flip-flop.

It should be noted that according to an embodiment, the method focuses on protection of memory elements rather than on a mechanism to detect and correct an error induced on the combinatorial (i.e. non-memory) part of the device, which, in case it is needed, may be protected by some additional redundancy technique.

However, in terms of reliability, the memory elements of a design are typically a very relevant part. Further, in case of a malicious manipulation like a fault attack, the protection of the memory elements makes the attack more difficult to be exploited and easier to be detected.

According to various embodiments, an automatic procedure is applied to a netlist of a circuit generated from, e.g., a standard HDL code by a standard synthesis tool.

FIG. 1 shows a processing arrangement 100 for forming an electronic circuit.

The processing arrangement 100 includes a design computer 101 by which a circuit designer may design a circuit in the form of a HDL description 102 of the circuit. The HDL description is then processed by a synthesis tool to generate a netlist 104.

The netlist 104 describes the electronic components of the circuit and their arrangement. The circuit is assumed, as it is typically the case, to include a multiplicity of D-flip-flops.

According to an embodiment, the circuit is supplemented by circuits for generating and storing correction bits for the flip-flops, i.e. an error detection (and possibly also correction) circuit is assigned to each of a group of flip-flops which allows detection (and possibly also correction) of errors of one or more bits stored by one or more of the flip-flops of the group. For example, the circuit allows detection of an error introduced into one or more of the flip-flops of the group.

The supplementation of error detection circuits is performed by a block 105 (which may be a corresponding software tool) and the resulting circuit design, e.g. in the form of a supplemented netlist 106 may then be given to a chip factory for manufacturing chips according to the design.

According to an embodiment, the procedure of supplementing the circuit with error detection circuits is completely transparent to the HDL design 102 and to the synthesis tool 103. For example, it is based on the netlist 104 and thus is not visible on the level of the HDL description 102 and the synthesis 103. Thus, according to one embodiment, error detection/correction techniques are applied after netlist generation in order to make the procedure transparent to the design and optimized for the chosen error detection/correction technique. The detection/correction techniques are applied to the circuit's set of flip-flops without regard to their functionality (i.e. to a "sea" of flip-flops), except that the flip-flops of the same group of flip-flops reside in the same clock domain of the circuit.

Figure 2:
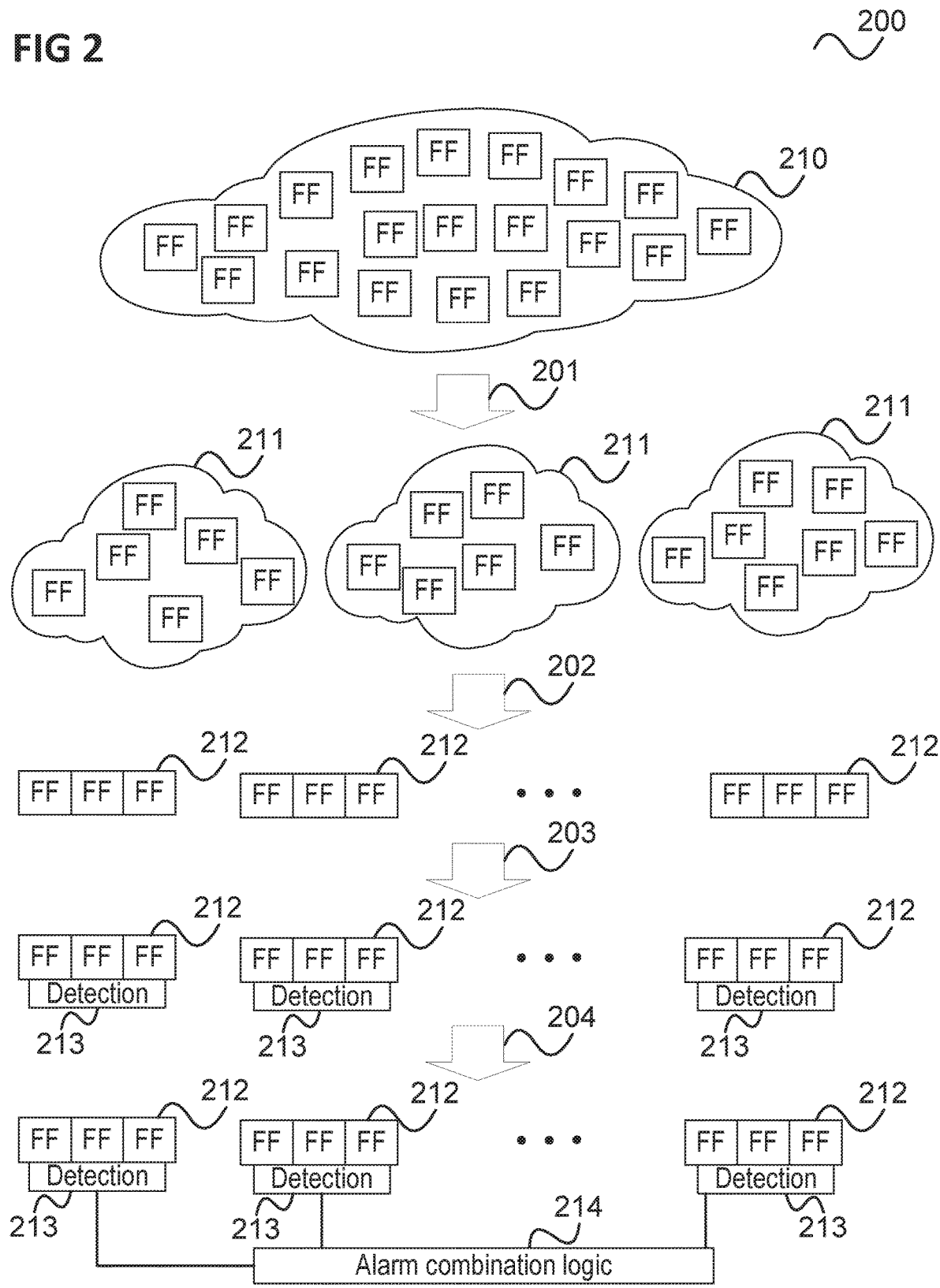
FIG. 2 illustrates a procedure for supplementing a circuit with error detection circuits.

FIG. 2 illustrates a procedure for supplementing a circuit with error detection circuits.

The procedure operates on a multiplicity of flip-flops 210 of an electronic circuit design.

In 201, the flip-flops are separated depending on their clock and, possibly, depending on their enabling domain (i.e. enable signal domain). This results in subsets 211 of flip-flops wherein the flip-flops of the same subset 211 belong to the same clock domain and, for example, also to the same enabling domain (i.e. they are enabled by a common enable signal).

In 202, the flip-flops of the subsets 211 are (within the subsets 211) grouped into groups of N flip-flops where N is a convenient size for the adopted error detection/correction code. This grouping may take into account the placement of the flip-flops such that neighboring elements (flip-flops) are grouped. This results in groups of flip-flops 212.

In 203, an error detection circuit 213 is added to each group 212. Each error detection circuit 213 for example includes combinatorial logic and storage elements (such as additional flip-flops) for generating and storing parity bits (for the contents of the flip-flops of the flip-flop group) as well as logic for checking the parity bits. In other words, logic for parity bit generation (encoding), memory elements for parity bit storage and logic for parity bit checking (decoding) are added to each group of flip-flops. The error detection circuit 213 operates according to an error correction code which, upon encoding, generates code words by adding parity bits to data words of length N.

In 204, circuitry 214 configured to collect the outputs of the parity bit checking logic according to chosen criteria is added. For example, the circuit 214 may perform an OR combination of the output signals of the parity bit checking logics (which indicate whether parity check was successful) to generate a single fault signal or may perform such a combination for various sub sets to generate more detailed fault signals. In the latter case, the flip-flop grouping at of 203 may take into account a certain "error-domain" that should be covered by a single or a group of specific dedicated error signals.

The error detection circuit 213 may, if it is desired and if the chosen error correction code allows this functionality, perform correction of errors. The error correction does not exclude that for monitoring or security purpose the error is detected and registered.

The procedure of adding error detection circuits to the flip-flops may be applied on a flat netlist, i.e. regardless any design hierarchy. It is also possible to split the detection and correction functionalities on different parts of the design, e.g. because a different fault management is needed depending on where the fault occurs.

Figure 3:
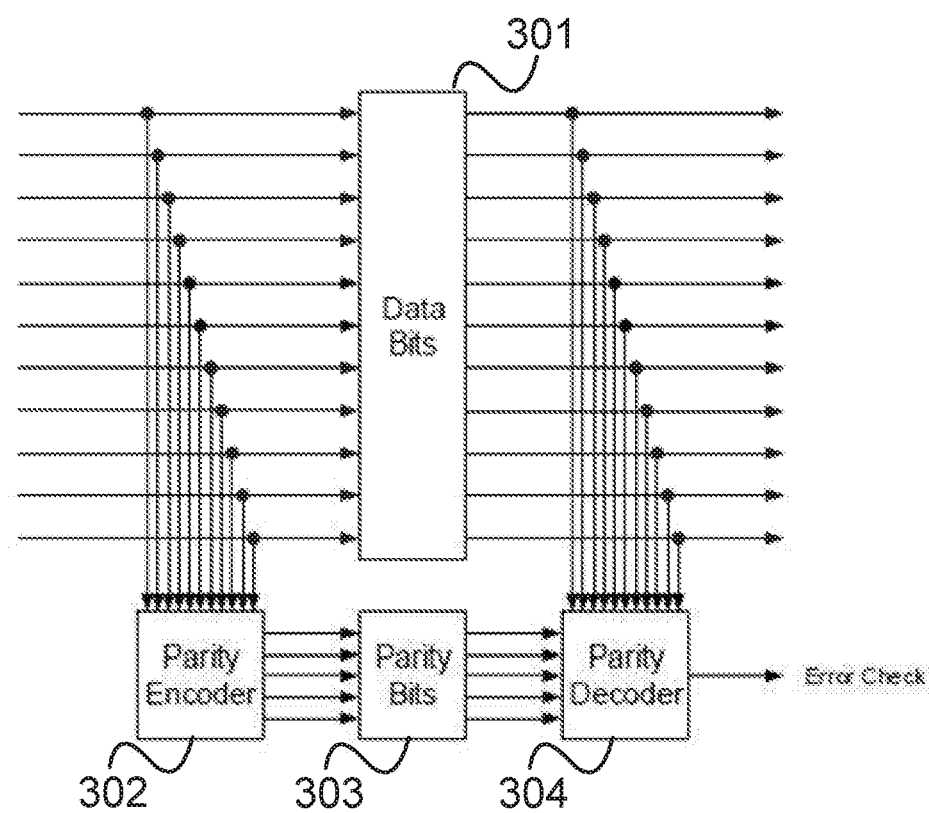
FIG. 3 shows an example how error correction logic is added to a generic group of flip-flops in case of error detection.

FIG. 3 shows an example how error correction logic is added to a generic group of flip-flops (data bits) in case of error detection.

A group of flip-flops 301 is represented as data bits. The group of flip-flops 301 for example corresponds to one of the groups 212 of FIG. 2.

The group of flip-flops 301 are supplied with input data to be stored by the flip-flops 301. This input data is supplied to a parity encoder 302 which generates parity bits for the input data and stores the parity bits in a parity memory 303. Upon read out of the flip-flops 301, a parity decoder 304 checks whether the stored parity bits are valid for the output data of the flip-flops 301. The parity decoder 304 generates an error check signal indicating whether the stored parity bits are valid for the output data of the flip-flops 301.

The parity encoder 302, the parity bit memory 303 and the parity decoder 304 for example correspond to the error detection circuit 213 for the respective flip-flop group 212.

Figure 4:
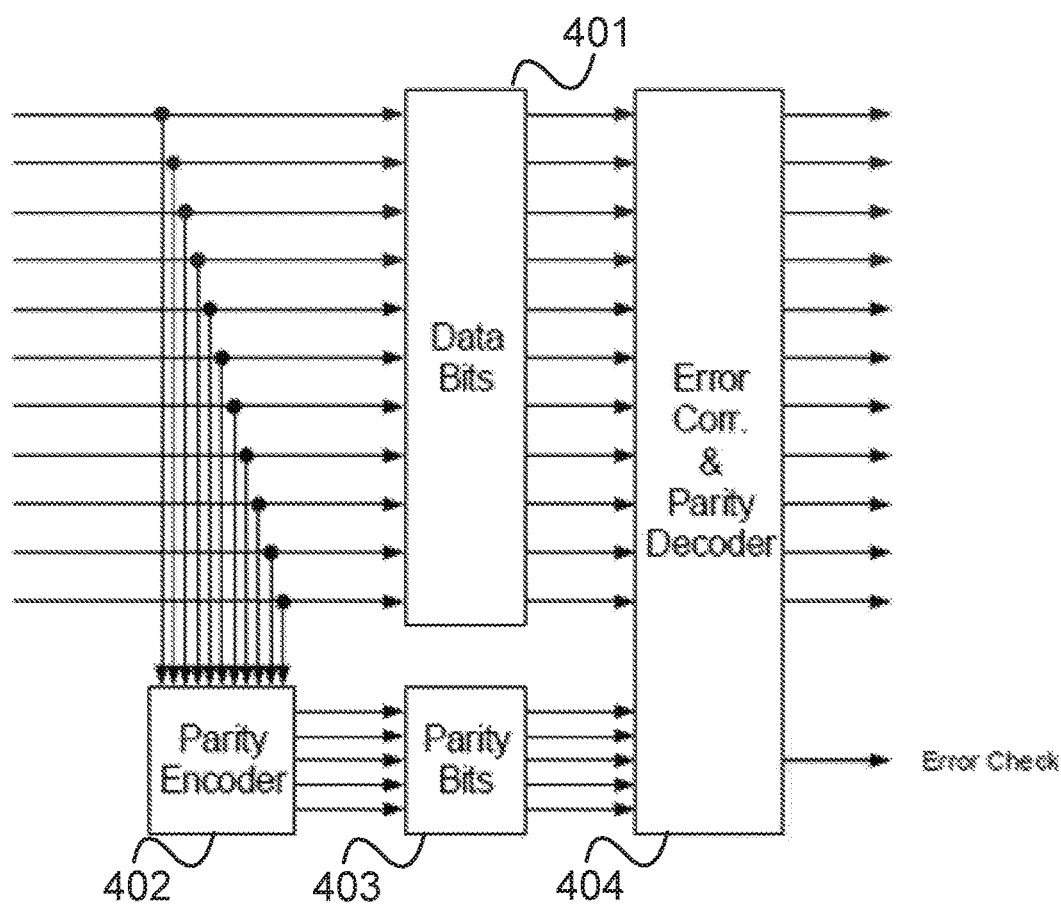
FIG. 4 shows an example how error correction and detection logic is added to a generic group of flip-flops in case of error detection.

FIG. 4 shows an example how error correction and detection logic is added to a generic group of flip-flops (data bits) in case of error detection.

Similarly to FIG. 3, a group of flip-flops 401 is represented as data bits and is supplied with input data to be stored which is also supplied to a parity encoder 402 which generates parity bits for the input data and stores the parity bits in a parity memory 403.

In this example, the added circuitry includes an error corrector and parity decoder 404 which, upon read out of the flip-flops 401, checks whether the stored parity bits are valid for the output data of the flip-flops 401 and, if there is an error, i.e. if the stored parity bits are valid for the output data of the flip-flops 401, corrects the output data of the flip-flops 401 if this is possible (depending on the number of errors and the Hamming distance of the code used). Further, it generates an error check signal indicating whether the stored parity bits are valid for the output data of the flip-flops 401.

The parity encoder 402, the parity bit memory 403 and the error corrector and parity decoder 404 for example correspond to the error detection circuit 213 for the respective flip-flop group 212.

The number of flip-flops per flip-flop group 212 may be fixed and the combinatorial logic of the error detection circuits 213 can accordingly be fixedly defined.

As an example, an Extended Hamming (63, 57) code or an Extended Hamming (127, 120) code which cover 57 or 120 data bits with 7 or 8 parity bits respectively, can be chosen. It should be noted that a single incomplete flip-flop group remaining after the flip-flop partition of 202 is not an issue from the efficiency point of view and, possibly, a smaller code can be used for such special case (i.e. smaller group size).

As mentioned above, according to one embodiment, the flip-flop groups 212 are formed such that all the flip-flops in a group 212 share not only the same clock, but also, if present, the same enable signal. In case it is needed to create a group of flip-flops which is not homogeneous with regard to enabling, a mechanism may be used which allows to correctly encode the parity bits nevertheless.

Figure 5:
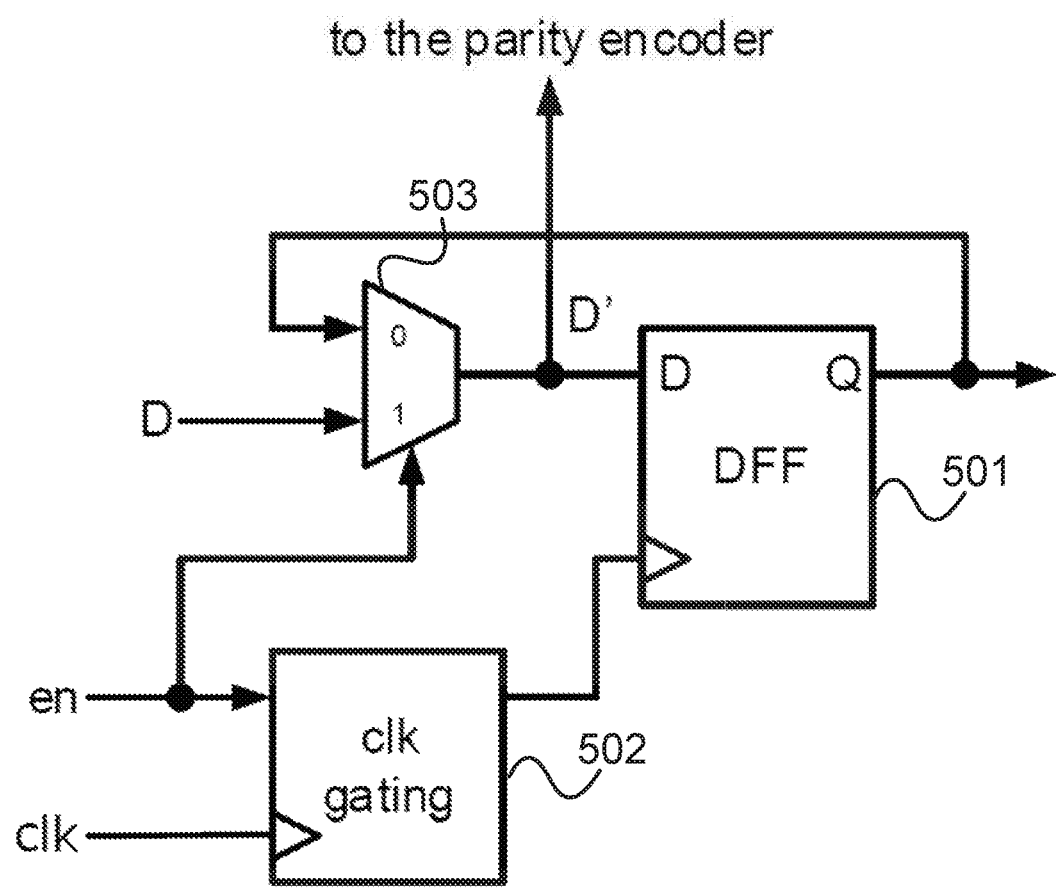
FIG. 5 shows an example for the extraction of an input bit for the parity encoder from a flip-flop of a group of flip-flops having different enable signals.

FIG. 5 shows an example for the extraction of an input bit for the parity encoder from a flip-flop of a group of flip-flops having different enable signals.

A flip-flop 501 is functionally gated (i.e. is disabled by suppressing its clock) by means of a clock gating circuit 502. When the flip-flop 501 is disabled, the input of the check bit generation (i.e. the parity encoder) is connected to the flip-flop output instead of the input D by means of a multiplexer 503 controlled by the enable signal en.

Figure 6:
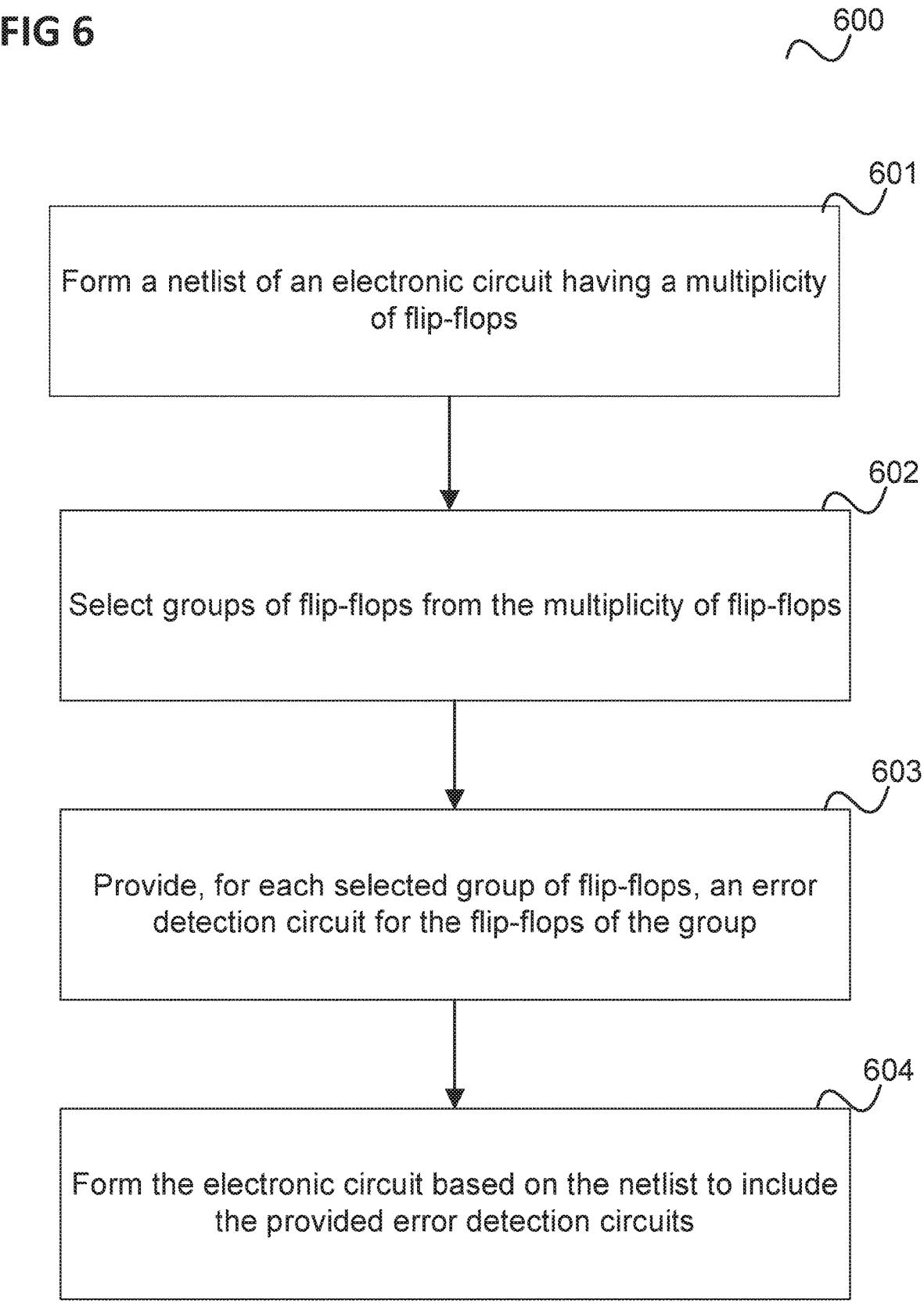
FIG. 6 shows a flow diagram illustrating a method for forming an electronic circuit.

In summary, according to various embodiments, a method is provided as illustrated in FIG. 6.

FIG. 6 shows a flow diagram 600 illustrating a method for forming an electronic circuit.

In 601, a netlist of an electronic circuit having a multiplicity of flip-flops is formed.

In 602, groups of flip-flops are selected from the multiplicity of flip-flops.

In 603, for each selected group of flip-flops, an error detection circuit is provided for the flip-flops of the group.

In 604, the electronic circuit is formed based on the netlist to include the provided error detection circuits.

According to various embodiments, in other words flip-flops of a circuit design are grouped to groups and each group is regarded as forming a memory storage word and is supplemented by error detection (and possibly correction) circuitry. This happens after netlist generation such that it is transparent to HDL description and synthesis. Thus, the circuit's design is changed by adding (providing) error detection circuitry for groups of flip-flops.

The error detection circuitry may include generation circuitry configured to generate and store error detection bits for bits to be stored by the group of flip-flops. The generation circuitry is for example a parity-check circuit. Actually, in case of pure error detection (no correction), it can consist of just a parity-generator (e.g. like parity encoder 302) and a comparator which checks that the parity bit generated for the output of the group of flip-flops (e.g. the flip-flop group) 301 are the same as the stored ones (e.g. output by the parity memory 303). In the general case (as described in FIG. 4), the parity-check is a a suitable function which allows also to find the position of the error and correct it.

According to various embodiments, first a hardware description language representation of the electronic circuit is formed and the netlist is then formed based on the hardware description language representation by means of synthesis. The further operations (grouping of flip-flops, providing of error detection circuits) is then carried out based on the netlist, i.e. after the synthesis. On HDL level, flip-flops that should be protected (i.e. provided with an error detection circuit) may be tagged, e.g. in case it is not desirable to protect all of them.

The approach of FIG. 6 provides a methodology to add attack detection and protection to a generic design. In various embodiments, this approach allows to add a robust security mechanism to an already existing design (i.e. without changing anything in the HDL code) and without any particular impact at layout level (robustness is in logic redundancy, not in secure wiring). It should be noted that since a low false error probability can be achieved, it is also possible to completely disable the electronic after few error occurrences. This can make it extremely difficult and frustrating for an attacker to mount laser beam attacks which, in order to not make the circuit unusable, need to be performed without corrupting even a single flip-flop state.

The electronic circuit that is formed may be any electronic circuit which should be protected against faults, e.g. due to attacks or malfunction. It may be a security-related electronic circuit such as a controller, e.g. in a vehicle, or an electronic circuit storing and processing confidential information, e.g. a chip card module of a chip card of any form factor. It may also be part of a computer system, e.g. be an electronic circuit performing certain operations in a bigger system, e.g. a co-processor.

FIG. 7 shows an arrangement 700 for forming an electronic circuit.

The arrangement 700 includes a circuit synthesis device 701 configured to form a netlist of an electronic circuit having a multiplicity of flip-flops.

The arrangement 700 further includes a circuit supplementation tool 702 configured to select groups of flip-flops from the multiplicity of flip-flops; and provide, for each selected group of flip-flops, an error detection circuit for the flip-flops of the group.

Further, the arrangement 700 includes a circuit manufacturing facility configured to form the electronic circuit based on the netlist to include the provided error detection circuits.

Various Examples are described in the following:

Example 1 is a method for forming an electronic circuit as illustrated in FIG. 6.

Example 2 is the method of Example 1, wherein the error detection circuit is provided for the flip-flops of the group based on an arrangement of the group of flip-flops as memory storage word regardless of their function in the electronic circuit.

Example 3 is the method of Example 1 or 2, wherein the error detection circuit includes generation circuitry configured to generate and store error detection bits for bits to be stored by the group of flip-flops.

Example 4 is the method of any one of Examples 1 to 3, wherein the error detection circuit includes checking circuitry configured to check whether the stored error detection bits are valid for bits read out from the group of flip-flops in the current state of the flip-flops.

Example 5 is the method of Example 4, wherein the checking circuitry is configured to output an alarm signal indicating whether the error detection bits are valid.

Example 6 is the method of Example 5, further including providing an alarm signal combination circuit configured to receive the alarm signals from the checking circuitry of multiple groups of flip-flops and to combine the alarm signal to a combined alarm signal.

Example 7 is the method of any one of Examples 4 to 6, wherein the error detection circuit includes correction circuitry configured to correct the bits read out from the group of flip-flops if the stored error detection bits are not valid for bits read out.

Example 8 is the method of any one of Examples 1 to 7, wherein the error detection bits are parity bits according to an error detection code.

Example 9 is the method of any one of Examples 1 to 8, including selecting the groups such that the flip-flops within a group belong to the same clock domain of the electronic circuit.

Example 10 is the method of any one of Examples 1 to 9, including selecting the groups such that the flip-flops within a group belong to the same enable signal domain of the electronic circuit.

Example 11 is the method of any one of Examples 1 to 10, wherein forming the electronic circuit based on the netlist to include the provided error detection circuits includes controlling a circuit manufacturing facility based on the netlist supplemented by the error detection circuits.

Example 12 is the method of any one of Examples 1 to 11, including selecting the groups irrespective of the function of the flip-flops in the electronic circuit.

Example 13 is an arrangement for forming an electronic circuit as illustrated in FIG. 7.

Example 14 is the arrangement of Example 13, wherein the circuit supplementation tool is configured to provide the error detection circuit for the flip-flops of the group based on an arrangement of the group of flip-flops as memory storage word regardless of their function in the electronic circuit.

Example 15 is the arrangement of Example 13 or 14, wherein the error detection circuit includes generation circuitry configured to generate and store error detection bits for bits to be stored by the group of flip-flops.

Example 16 is the arrangement of any one of Examples 13 to 15, wherein the error detection circuit includes checking circuitry configured to check whether the stored error detection bits are valid for bits read out from the group of flip-flops in the current state of the flip-flops.

Example 17 is the arrangement of Example 16, wherein the checking circuitry is configured to output an alarm signal indicating whether the error detection bits are valid.

Example 18 is the arrangement of Example 17, wherein the circuit supplementation tool is further configured to provide an alarm signal combination circuit configured to receive the alarm signals from the checking circuitry of multiple groups of flip-flops and to combine the alarm signal to a combined alarm signal.

Example 19 is the arrangement of any one of Examples 16 to 18, wherein the error detection circuit includes correction circuitry configured to correct the bits read out from the group of flip-flops if the stored error detection bits are not valid for bits read out.

Example 20 is the arrangement of any one of Examples 13 to 19, wherein the error detection bits are parity bits according to an error detection code.

Example 21 is the arrangement of any one of Examples 13 to 20, wherein the circuit supplementation tool is configured to select the groups such that the flip-flops within a group belong to the same clock domain of the electronic circuit.

Example 22 is the arrangement of any one of Examples 13 to 21, wherein the circuit supplementation tool is configured to select the groups such that the flip-flops within a group belong to the same enable signal domain of the electronic circuit.

Example 23 is the arrangement of any one of Examples 13 to 22, including a controller configured to control the circuit manufacturing facility based on the netlist supplemented by the error detection circuits.

Example 24 is the arrangement of any one of Examples 13 to 23, wherein the circuit supplementation tool is configured to select the groups irrespective of the function of the flip-flops in the electronic circuit.

According to a further example, a method and an arrangement for forming an electronic circuit are provided including supplementing a circuit design by error detection circuit assigned to groups of flip-flops of the circuit design and manufacturing a circuit based on the supplemented circuit design.

According to another embodiment, an arrangement for forming an electronic circuit is provided including forming means for forming a netlist of an electronic circuit having a multiplicity of flip-flops, selecting means for selecting groups of flip-flops from the multiplicity of flip-flops, providing means for providing, for each selected group of flip-flops, an error detection circuit for the flip-flops of the group, and circuit forming means for forming the electronic circuit based on the netlist to include the provided error detection circuits.

It should be noted that examples and embodiments described in context of the method for forming an electronic circuit are analogously valid for the arrangement for forming an electronic circuit and vice versa.

LIST OF REFERENCE SIGNS 100 processing arrangement
101 design computer
102 HDL description
103 synthesis tool
104 netlist
105 error detection supplementation
106 supplemented netlist
201-204 processing operations
210 flip-flops
211 flip-flop subsets
212 flip-flop groups
213 error detection circuits
214 alarm signal collection circuitry
301 flip-flop group
302 parity encoder
303 parity memory
304 parity decoder
401 flip-flop group
402 parity encoder
403 parity memory
404 error corrector and parity decoder
501 flip-flop
502 clock gating circuit
503 multiplexer
600 flow diagram
601-604 processing operations
700 arrangement for forming an electronic circuit
701 circuit synthesis device
702 circuit supplementation tool While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for forming an electronic circuit, the method comprising:
   forming a netlist of an electronic circuit having a multiplicity of flip-flops;
   selecting groups of flip-flops from the multiplicity of flip-flops;
   providing, for each selected group of flip-flops, an error detection circuit for the flip-flops of the group; and
   forming the electronic circuit based on the netlist to include the provided error detection circuits;
   wherein the error detection circuit comprises generation circuitry configured to obtain bits to be stored by the group of flip-flops, generate error detection bits from the bits to be stored by the group of flip-flops, and to store the generated error detection bits.

2. The method of claim 1,
   wherein the error detection circuit is provided for the flip-flops of the group based on an arrangement of the group of flip-flops as memory storage word regardless of their function in the electronic circuit.

3. The method of claim 1,
   wherein the error detection circuit comprises checking circuitry configured to obtain bits read out from the group of flip-flops and check whether the stored error detection bits are valid for the obtained bits read out from the group of flip-flops in the current state of the flip-flops.

4. The method of claim 3,
   wherein the checking circuitry is configured to output an alarm signal indicating whether the error detection bits are valid.

5. The method of claim 4, further comprising:
   providing an alarm signal combination circuit configured to receive the alarm signals from the checking circuitry of multiple groups of flip-flops and to combine the alarm signal to a combined alarm signal.

6. The method of claim 3,
   wherein the error detection circuit comprises correction circuitry configured to correct the bits read out from the group of flip-flops if the stored error detection bits are not valid for bits read out.

7. The method of claim 1,
   wherein the error detection bits are parity bits according to an error detection code.

8. The method of claim 1, further comprising:
   selecting the groups such that the flip-flops within a group belong to the same clock domain of the electronic circuit.

9. The method of claim 1, further comprising:
   selecting the groups such that the flip-flops within a group belong to the same enable signal domain of the electronic circuit.

10. The method of claim 1,
    wherein forming the electronic circuit based on the netlist to include the provided error detection circuits includes controlling a circuit manufacturing facility based on the netlist supplemented by the error detection circuits.

11. The method of claim 1, further comprising:
    selecting the groups irrespective of the function of the flip-flops in the electronic circuit.

12. An arrangement for forming an electronic circuit, the arrangement comprising:
    a circuit synthesis device configured to form a netlist of an electronic circuit having a multiplicity of flip-flops;
    a circuit supplementation tool configured to
      select groups of flip-flops from the multiplicity of flip-flops; and
      provide, for each selected group of flip-flops, an error detection circuit for the flip-flops of the group; and
    a circuit manufacturing facility configured to form the electronic circuit based on the netlist to include the provided error detection circuits;
    wherein the error detection circuit comprises generation circuitry configured to obtain bits to be stored by the group of flip-flops, generate error detection bits from the bits to be stored by the group of flip-flops, and to store the generated error detection bits.

* * * * *